US010931341B2

(12) United States Patent
Hwang et al.

(10) Patent No.: US 10,931,341 B2
(45) Date of Patent: Feb. 23, 2021

(54) CHANNEL STATE INFORMATION EXTRACTION METHOD AND MIMO RECEIVER USING QR DECOMPOSITION AND MMIB METRIC (71) Applicant: GCT Research, Inc., Seoul (KR)

(72) Inventors: In Seok Hwang, Seoul (KR); Ji Ho Jang, Seoul (KR); Tae Won Park, Dangjin-si (KR)

(73) Assignee: GCT RESEARCH, INC., Seoul (KR)

(*) Notice: Subject to any disclaimer, the term of this patent is extended or adjusted under 35 U.S.C. 154(b) by 0 days.

(21) Appl. No.: 16/748,859

(22) Filed: Jan. 22, 2020

(65) Prior Publication Data
US 2020/0235795 A1 Jul. 23, 2020

(30) Foreign Application Priority Data
Jan. 23, 2019 (KR) .................... 10-2019-0008641

(51) Int. Cl.
H04L 1/02 (2006.01)
H04B 7/0456 (2017.01)
H04L 5/00 (2006.01)
H04B 7/06 (2006.01)

(52) U.S. Cl.
CPC ........... H04B 7/0486 (2013.01); H04B 7/063 (2013.01); H04B 7/0626 (2013.01); H04B 7/0632 (2013.01); H04L 5/0048 (2013.01)

(58) Field of Classification Search
CPC ..... H04L 1/0618; H04L 1/06; H04L 25/0224; H04L 5/0035; H04B 7/0626; H04B 7/0486; H04B 7/0478; H04W 72/1289; H04W 72/1273

USPC .................. 375/267, 130, 259, 260; 370/329
See application file for complete search history.

(56) References Cited

U.S. PATENT DOCUMENTS

| 10,224,990 | B2 | 3/2019 | Kim et al. | |
| 2013/0324136 | A1* | 12/2013 | Hirata | H04W 16/32 455/447 |
| 2015/0288499 | A1* | 10/2015 | Nam | H04B 7/0478 370/329 |
| 2019/0140716 | A1* | 5/2019 | Frank | H04B 7/0632 |
| 2019/0312697 | A1* | 10/2019 | Li | H04L 27/0014 |
| 2019/0363765 | A1* | 11/2019 | Yoshioka | H04L 25/0202 |

FOREIGN PATENT DOCUMENTS

KR 10-2017-0020357 A 2/2017

* cited by examiner

Primary Examiner — Khai Tran (57) ABSTRACT

The present invention relates to a CSI extraction method in a MIMO receiver used in a wireless communication system, the method including: obtaining an effective channel matrix by matrix multiplication of a precoding matrix and a channel estimation value obtained through a CSI-RS; calculating an upper and a lower bound of a minimum distance for each layer through QR decomposition for the effective channel matrix; and mapping the upper and the lower bound of the minimum distance for each layer to each codeword, and extracting a mean mutual information per bit (MMIB) metric that is a transmission capacity per unit frequency for each codeword. According to the present invention, QR decomposition and a MMIB metric are used to obtain the minimum distance for each layer without a multidimensional search process, whereby the CSI is extracted with fewer operations than the conventional method when the MIMO transmission order is high.

20 Claims, 7 Drawing Sheets

CHANNEL STATE INFORMATION EXTRACTION METHOD AND MIMO RECEIVER USING QR DECOMPOSITION AND MMIB METRIC

CROSS REFERENCE TO RELATED APPLICATION

This application claims priority under 35 U.S.C. §119 to Korean Patent Application No. 10-2019-0008641, filed Jan. 23, 2019, the disclosure of which is incorporated by reference in its entirety.

BACKGROUND OF THE INVENTION

Field of the Invention

The present invention relates to a method of efficiently extracting channel state information (CSI) of a multiple-input and multiple-output (MIMO) receiver that is used in a wireless communication system using multiple antennas, and to a MIMO receiver using the method.

Description of the Related Art

A rapidly developing wireless communication system provides a voice service as well as a data service. To increase user's data transmission rate, telecommunications operators have introduced a multi-antenna technology. Examples of this system include 3.5th, 4th, and 5th generation mobile communication systems, such as OFDM-based IEEE 802.16, LTE, LTE-A, 5G new radio (NR) and the like.

When multiple signals are simultaneously transmitted using the same frequency in the wireless communication system, the signals interfere with each other. Therefore, to solve this problem, a receiver (or terminal) detects multiple signals using a MIMO maximum likelihood (ML) detector and generates information on a current channel state and reports the information to a base station so as to reduce interference between the multiple signals and to determine the number of signals simultaneously transmitted. The information is called channel state information (CSI) in the communications protocol. The channel state information includes a rank indicator (RI) that is information on the number of simultaneously transmitted signals, a precoding matrix indicator (PMI) that is information on a precoding matrix for reducing interference which the terminal prefers, a channel quality indicator (CQI) that is channel quality information used to determine a modulation and coding scheme (MCS) index which is modulation and code rate of simultaneously transmitted signals, and the like. Therefore, in the MIMO receiver, it is very important to generate the channel state information supporting the maximum transmission rate while reflecting the reception performance of the MIMO ML detector.

In particular, in the case of the LTE-A system, which is 4G mobile communication, or of the 5G new radio (NR) system, MIMO transmission is supported up to eight signals to increase frequency efficiency. Therefore, a method and a device for extracting more accurate channel state information are needed. The conventional channel state information extractor assumes a linear receiver, and calculates the channel quality and the channel capacity to use these in generating the channel state information. Further, in the case of using the MIMO ML detector, due to search complexity, a method where an error vector of QPSK constellation level is assumed, the minimum distance is found, and the corresponding value is utilized as the channel quality information.

However, in the conventional method of determining the channel quality by the MIMO ML detector, the error vector of QPSK constellation level is assumed and the minimum distance is found, and thus the search complexity increases in proportion to exponentiation of the MIMO transmission order, which requires many operations. Also, when higher-order modulation such as 256QAM, and 1024QAM is used, an error occurs in the found minimum distance.

The foregoing is intended merely to aid in the understanding of the background of the present invention, and is not intended to mean that the present invention falls within the purview of the related art that is already known to those skilled in the art.

Document of Related Art (Patent Document 1) KR 10-2017-0020357 A.

SUMMARY OF THE INVENTION

Accordingly, the present invention has been made keeping in mind the above problems occurring in the related art, and the present invention is intended to propose a method and an MIMO receiver using the method, the method capable of being extracting channel state information (CSI) with fewer operations than the conventional method when the MIMO transmission order is high, by obtaining the minimum distance for each layer without a multidimensional search process.

In order to achieve the above objective, according to one aspect of the present invention, there is provided a channel state information (CSI) extraction method in a multiple-input and multiple-output (MIMO) receiver used in a wireless communication system, the method including: obtaining an effective channel matrix by matrix multiplication of a precoding matrix and a channel estimation value obtained through a channel state information reference signal (CSI-RS); calculating an upper bound and a lower bound of a minimum distance for each layer through QR decomposition for the effective channel matrix; and mapping the upper bound and the lower bound of the minimum distance for each layer to each codeword, and extracting a mean mutual information per bit (MMIB) metric that is a transmission capacity per unit frequency for each codeword.

The method may further include determining and extracting the channel state information from a transmission capacity of each effective channel extracted using the MMIB metric.

The MMIB metric may be calculated through a sum process where a predetermined weighting is given to the upper bound and the lower bound.

The method may further include determining a rank indicator (RI) included in the channel state information as a rank value of the precoding matrix having the maximum sum of the MMIB metrics of all subcarriers of the channel state information reference signal which is present in all observation bands.

The method may further include determining a precoding matrix indicator (PMI) included in the channel state information by selecting the precoding matrix having the maximum sum of the MMIB metrics in all observation bands, among the precoding matrixes having a predetermined rank indicator (RI).

The method may further include determining a precoding matrix indicator (PMI) included in the channel state information by selecting the precoding matrix having the maximum sum of the MMIB metrics for each sub-band, among the precoding matrixes having a predetermined rank indicator (RI).

The method may further include selecting a channel quality indicator (CQI) included in the channel state information by using a table look-up method in accordance with a characteristic of a channel, from a transmission quality per codeword (ppCINR) obtained through MMIB inverse transformation, after an average of values of the MMIB metrics in all bands is obtained by applying the precoding matrix having a predetermined precoding matrix indicator (PMI) value.

The upper bound and the lower bound may be determined on the basis of diagonal elements of a triangular matrix generated through the QR decomposition for the effective channel matrix.

When multiple MIMO symbols are mapped to one codeword, a value of the MMIB metric of the codeword may be the minimum value among values of the MMIB metrics for the respective MIMO symbols.

The QR decomposition may be performed on each of matrixes resulting from column flipping of the effective channel matrix and the effective channel matrix.

According to another aspect of the present invention, there is provided a program stored on a computer-readable recording medium, the program for executing the method according to any one of the above-described methods.

According to still another aspect of the present invention, there is provided a computer-readable recording medium having a program recorded thereon, the program for executing the method according to any one of the above-described methods.

In order to achieve the above objective, according to still another aspect of the present invention, there is provided a channel state information extraction device in an MIMO receiver used in a wireless communication system, the device including: a channel state analysis unit configured to, obtain an effective channel matrix by matrix multiplication of a precoding matrix and a channel estimation value obtained through a channel state information reference signal, calculate an upper bound and a lower bound of a minimum distance for each layer through QR decomposition for the effective channel matrix, map the upper bound and the lower bound of the minimum distance for each layer to each codeword, and extract an MMIB metric that is a transmission capacity per unit frequency for each codeword; and a channel state information determination unit determining and extracting the channel state information from a transmission capacity of each effective channel extracted using the MMIB metric.

The MMIB metric may be calculated through a sum process where a predetermined weighting is given to the upper bound and the lower bound.

A rank indicator (RI) included in the channel state information may be determined as a rank value of the precoding matrix having the maximum sum of the MMIB metrics of all subcarriers of the channel state information reference signal which is present in all observation bands.

A precoding matrix indicator (PMI) included in the channel state information may be determined selecting the precoding matrix having the maximum sum of the MMIB metrics in all observation bands, among the precoding matrixes having a predetermined rank indicator (RI).

A precoding matrix indicator (PMI) included in the channel state information may be determined selecting the precoding matrix having the maximum sum of the MMIB metrics for each sub-band, among the precoding matrixes having a predetermined rank indicator (RI).

A channel quality indicator (CQI) included in the channel state information may be selected using a table look-up method in accordance with a characteristic of a channel, from a transmission quality per codeword (ppCINR) obtained through MMIB inverse transformation, after an average of values of the MMIB metrics in all bands is obtained by applying the precoding matrix having a predetermined precoding matrix indicator (PMI) value.

The upper bound and the lower bound may be determined on the basis of diagonal elements of a triangular matrix generated through the QR decomposition for the effective channel matrix.

When multiple MIMO symbols are mapped to one codeword, a value of the MMIB metric of the codeword may be the minimum value among values of the MMIB metrics for the respective MIMO symbols.

The QR decomposition may be performed on each of matrixes resulting from column flipping of the effective channel matrix and the effective channel matrix.

In order to achieve the above objective, according to still another aspect of the present invention, there is provided a MIMO receiver including the device.

As described above, according to the present invention, QR decomposition and a mean mutual information per bit (MMIB) metric are used to obtain the minimum distance for each layer without a multidimensional search process, whereby the channel state information (CSI) is extracted with fewer operations than the conventional method when the MIMO transmission order is high.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, exemplary embodiments of the present invention will be described in detail with reference to the accompanying drawings such that the invention can be easily embodied by those skilled in the art to which this invention belongs. In the following description, only parts necessary for understanding the operation according to an embodiment of the present invention are shown and described, and the illustration and description of other parts are omitted so as not to obscure the gist of the present invention. However, the present invention may be embodied in various different forms and should not be limited to the embodiments set forth herein.

Also, all terms or words used herein should not be interpreted as being limited merely to common and dictionary meanings but should be interpreted as having meanings and concepts which are defined within the technical idea of the present invention in order to describe the present invention most appropriately.

While, for purposes of simplicity of description, the one or more methods shown herein, e.g., in the form of a flowchart or flow diagram, are shown and described as a series of steps, it is to be understood and appreciated that the invention is not limited by the order of steps, as some steps may, in accordance therewith, occur in a different order and/or concurrently with other steps from that shown and described herein. Moreover, not all illustrated steps may be required to implement a method in accordance with the invention.

As used herein, the singular forms "a", "an", and "the" are intended to include the plural forms as well, unless the context clearly indicates otherwise. It is to be understood that the terms "comprise", or the like where used herein, specify the presence of stated features, numbers, steps, operations, elements, components or combinations thereof, but do not preclude the presence or addition of one or more other features, numbers, steps, operations, elements, components, or combinations thereof.

Prior to describing and illustrating figures in detail, a division of the configuration units in the present invention is intended for ease of description and divided only by the main function set for each configuration unit. That is, two or more of the configuration units to be described hereinafter may be combined into a single configuration unit or formed by two or more of divisions by function into more than a single configuration unit. Furthermore, each of the configuration units to be described hereinafter may additionally perform a part or all of the functions among functions set for other configuration units other than being responsible for the main function, and a part of the functions among the main functions set for each of the configuration units may be exclusively taken and performed by other configuration units.

Figure 1:
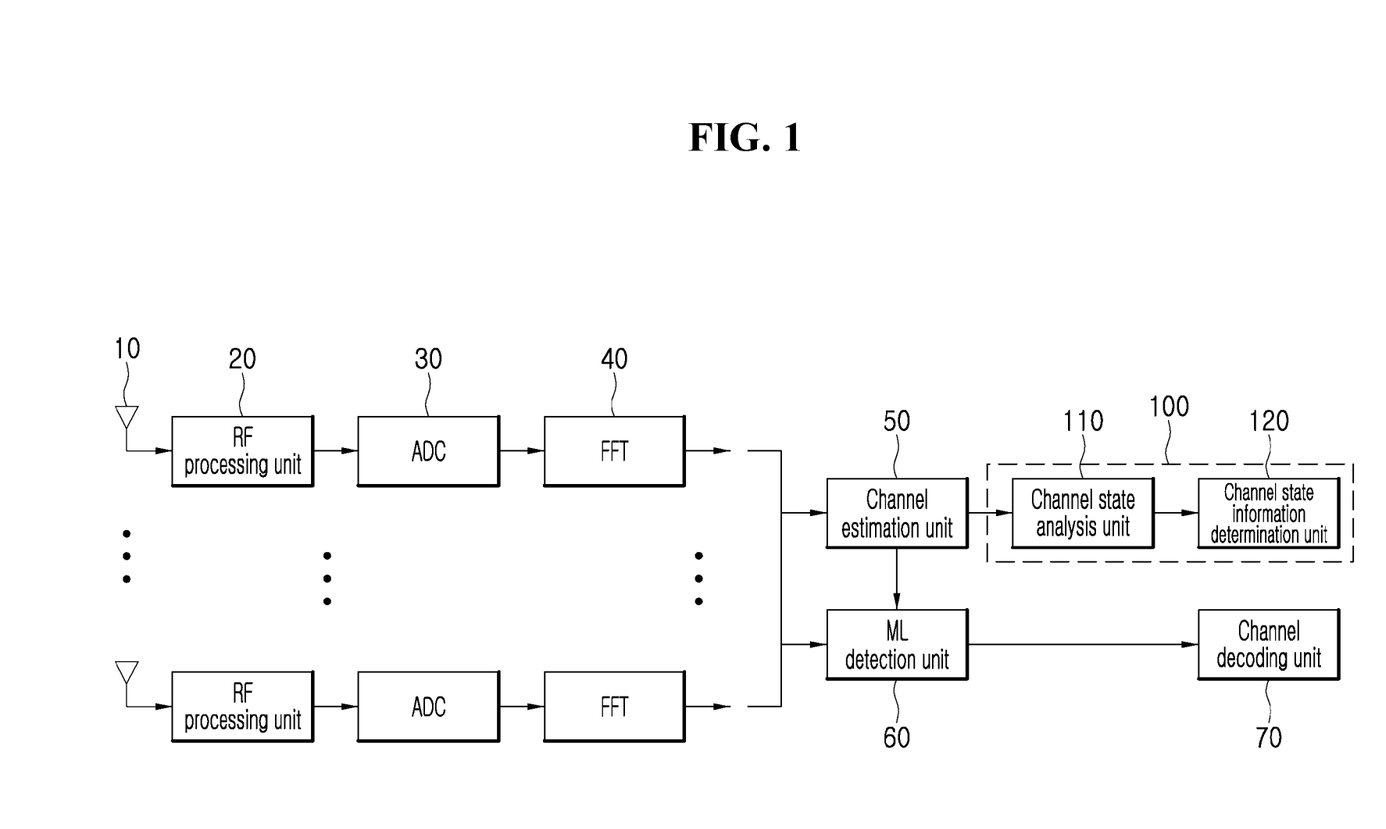
FIG. 1 is a block diagram illustrating a structure of a MIMO receiver that includes a channel state information extraction unit according to an embodiment of the present invention.

FIG. 1 is a block diagram illustrating a structure of a MIMO receiver that includes a channel state information extraction unit 100 according to an embodiment of the present invention.

FIG. 1 shows a common MIMO receiver in a MIMO wireless communication system, where signals are received by multiple antennas 10, an ADC 30 converts a received signal for each antenna into a digital signal, the digital signal is transformed into a frequency-domain signal by operation of an FFT 40, and the resulting signal passes through an ML detection unit 60 and a channel decoding unit 70.

A channel estimation unit 50 estimates a channel estimation value H from a reference signal when the channel state information reference signal (CSI-RS) is present in the frequency-domain signal.

The channel state information extraction unit 100 extracts the channel state information (CSI) that is information on a current channel state for reducing interference between multiple signals and for determining the number of signals being transmitted simultaneously. The extracted channel state information is reported to base station.

The present invention relates to the channel state information extraction unit 100 and a MIMO receiver including the channel state information extraction unit 100. The channel state information extraction unit 100 may include a channel state analysis unit 110 and a channel state information determination unit 120.

Figure 2:
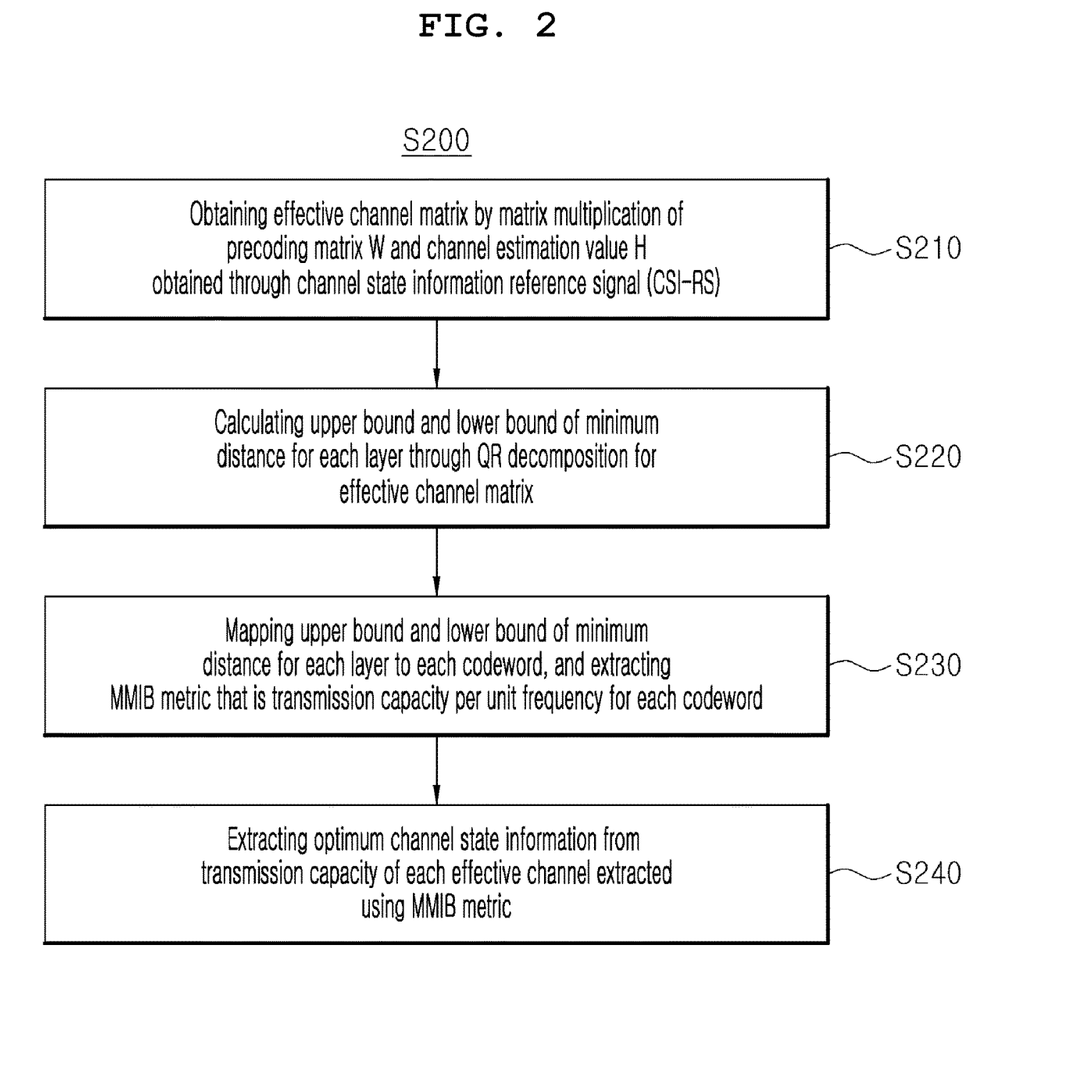
FIG. 2 is a flowchart illustrating a detailed example of a channel state information extraction method according to an embodiment of the present invention.

FIG. 2 is a flowchart (S200) illustrating a detailed example of a channel state information extraction method according to an embodiment of the present invention, which is a detailed example of a method of implementing the channel state information extraction unit 100 according to the present invention.

Referring to FIG. 2, at step S210, the channel state information extraction unit 100 may obtain an effective channel matrix by matrix multiplication of a precoding matrix W and the channel estimation value H obtained through the channel state information reference signal (CSI-RS).

Regarding the error rate performance of the MIMO ML detector, analytic expression expansion is difficult. Thus, in general, "performance bound" is analyzed, and the minimum distance for each layer is postulated as a key performance index. When v layers are transmitted through P transmission antennas by using a precoding matrix of (P×v) which is called W, a reception signal of a terminal is defined as Expression 1.

$$y = \tilde{H}s + n = HWs + n \qquad \text{Expression 1}$$

In Expression 1, H denotes a ($n_{rx}$×P) channel matrix, and $n_{rx}$ denotes the number of reception antennas. The expression n~N(0,$\sigma_n^2$I) denotes Gaussian normal distribution where the mean vector is 0 and, as white noise, the covariance matrix is $\sigma_n^2$I, defined using a vector with order $n_{rx}$. Herein, the reception performance error rate of an ML receiver may be approximated as in Expression 2, and $d_2^{min}$ may be defined as the minimum distance.

$$Pr\{\text{error}|\tilde{H}\} \leq Q\left(\sqrt{\frac{1}{\sigma_n^2} d_{min}^2(\tilde{H})}\right) \text{ where} \qquad \text{[Expression 2]}$$

$$d_{min}^2(\tilde{H}) = \min_{s, c \in QAM^v, s \neq c} \|\tilde{H}(s-c)\|^2,$$

$$Q(x) = \frac{1}{\sqrt{2\pi}} \int_x^\infty \exp\left(-\frac{u^2}{2}\right) du \leq \exp\left(-\frac{x^2}{2}\right)$$

In the related art, regarding the minimum distance of the MIMO ML receiver, the error vector $\hat{B}_i$ in a QPSK constellation is obtained for each layer, and the distance is found for each layer. In the case of v=2, the approximated error probability, the search space $\hat{B}_i$, and the minimum distance $d_{min, i}^2(\tilde{H})$ may be summarized as in Expression 3 to Expression 6.

Expression 3 shows an approximation of the error rate by averaging all MIMO symbol error patterns. Expression 4 shows an approximation by selecting, as a representative value, the case of the minimum distance between the true symbol to the closest error symbol among MIMO symbol error patterns and by additionally simplifying the result.

$$Pr\{\text{error in } s_i | \tilde{H}\} \approx \sum_{e \in \hat{B}_i} e^{-\frac{\|\tilde{H}e\|^2}{4\sigma_n^2}} \qquad \text{[Expression 3]}$$

-continued $$Pr\{\text{error in } s_i \mid \tilde{H}\} \approx e^{-\min_{e \in \hat{B}_i} \frac{\|\tilde{H}e\|^2}{4\sigma_{\tilde{n}}^2}} = e^{-\frac{d_{min,i}^2(\tilde{H})}{\sigma_{\tilde{n}}^2/2}} \quad \text{[Expression 4]}$$

$$d_{min,i}^2(\tilde{H}) = \min_{e \in \hat{B}_i} \frac{\|\tilde{H}e\|^2}{2} \quad \text{[Expression 5]}$$

$$\hat{B}_0 = \sqrt{2} \left\{ \begin{bmatrix} 1 \\ 0 \end{bmatrix}, \begin{bmatrix} 1 \\ 1 \end{bmatrix}, \begin{bmatrix} 1 \\ j \end{bmatrix}, \begin{bmatrix} 1 \\ -1 \end{bmatrix}, \begin{bmatrix} 1 \\ -j \end{bmatrix}, \begin{bmatrix} 1 \\ 1-j \end{bmatrix}, \\ \begin{bmatrix} 1 \\ 1+j \end{bmatrix}, \begin{bmatrix} 1 \\ -1+j \end{bmatrix}, \begin{bmatrix} 1 \\ -1-j \end{bmatrix}, \begin{bmatrix} 1+j \\ 1 \end{bmatrix}, \\ \begin{bmatrix} 1+j \\ -1 \end{bmatrix}, \begin{bmatrix} 1+j \\ j \end{bmatrix}, \begin{bmatrix} 1+j \\ -j \end{bmatrix} \right\} \quad \text{[Expression 6]}$$

$$\hat{B}_i = \sqrt{2} \left\{ \begin{bmatrix} 0 \\ 1 \end{bmatrix}, \begin{bmatrix} 1 \\ 1 \end{bmatrix}, \begin{bmatrix} 1 \\ j \end{bmatrix}, \begin{bmatrix} 1 \\ -1 \end{bmatrix}, \begin{bmatrix} 1 \\ -j \end{bmatrix}, \begin{bmatrix} 1 \\ 1-j \end{bmatrix}, \\ \begin{bmatrix} 1 \\ 1+j \end{bmatrix}, \begin{bmatrix} 1 \\ -1+j \end{bmatrix}, \begin{bmatrix} 1 \\ -1-j \end{bmatrix}, \begin{bmatrix} 1+j \\ 1 \end{bmatrix}, \\ \begin{bmatrix} 1+j \\ -1 \end{bmatrix}, \begin{bmatrix} 1+j \\ j \end{bmatrix}, \begin{bmatrix} 1+j \\ -j \end{bmatrix} \right\}$$

However, in order to obtain the value of the minimum distance $d_{min}$ in Expression 4, a M-QAM symbol of each of L MIMO layers needs to be searched, and the size of the area to be searched is proportional to $M^L$, which requires considerable operations.

Therefore, in order to solve the problem, in the present invention, "as in Expression 7 and Expression 8, QR decomposition is performed on the channel estimation value H in Expression 1 in order to obtain the upper bound and the lower bound of the minimum distance without constellation limit.

$$y = HWs + n = \tilde{H}s + n = QRs + n \quad \text{Expression 7}$$

$$Q^H y = Q^H(QRs + n) = Rs + Q^H n = Rs + \tilde{n} \quad \text{Expression 8}$$

In Expression 7 and Expression 8, Q is a unitary matrix of ($n_{rx}$ by $n_{rx}$), and R is a triangular matrix of (v by v) where a value is present only on a component that is positioned on one side of a main diagonal such as an upper triangular and a lower triangular.

In the case of a 2×2 MIMO system, defining effective channel matrix $\tilde{H} = [h_1 : h_0]$, it is found that the lower bound $a_0$ of the minimum distance $d_{min, 0}^2$ of the symbol $s_0$ in Expression 9 is $|r_{11}|^2/\sigma_n^2$. This is because, this value is the effective signal-to-noise ratio for the symbol $s_0$ when information obtained through $r_{01}$ is not used.

Further, it is found that the upper bound $b_0$ of the minimum distance $d_{min, 1}^2$ of the symbol $s_1$ is $|r_{00}|^2/\sigma_n^2$. This is because, this value is the effective signal-to-noise ratio for the symbol $s_1$ when the interference by the symbol $s_0$ through $r_{01}$ is excluded.

$$Q^H y = Rs + Q^H n = \begin{bmatrix} r_{00} & r_{01} \\ 0 & r_{11} \end{bmatrix} \begin{bmatrix} s_1 \\ s_0 \end{bmatrix} + \tilde{n} \quad \text{[Expression 9]}$$

Defining $\tilde{H}' = [h_0 : h_1]$, the same logic may be applied equally. In Expression 10, it is found that the lower bound $a_1$ of the minimum distance $d_{min, 1}^2$ of the symbol $s_1$ is $|r_{11}'|^2/\sigma_n^2$. This is because, this value is the effective signal-to-noise ratio for the symbol $s_1$ when information obtained through $r_{01}'$ is not used.

Further, it is found that the upper bound $b_1$ of the minimum distance $d_{min, 0}^2$ of the of the symbol $s_0$ is $|r_{00}'|^2/$ $\sigma_n^2$. This is because, this value is the effective signal-to-noise ratio for the symbol $s_0$ when the interference by the symbol $s_1$ through $r_{01}'$ is excluded.

$$Q'^H y = \quad \text{[Expression 10]}$$
$$Q'^H \tilde{H}' s + Q'^H n = R's + Q'^H n = \begin{bmatrix} r_{00}' & r_{01}' \\ 0 & r_{11}' \end{bmatrix} \begin{bmatrix} s_0 \\ s_1 \end{bmatrix} + \tilde{n}'$$

At step S220, as in Expression 7 to Expression 10, the upper bound and the lower bound of the minimum distance for each layer may be calculated through the QR decomposition for the effective channel matrix.

The QR decomposition is one of the methods used for demodulating symbols sequentially by a low-complexity MIMO receiver. In the present invention, to generate the channel state information (CSI), the QR decomposition is introduced for use of the advantage thereof.

As described above, in order to obtain the value of the minimum distance $d_{min}$ in Expression 4, the M-QAM symbol of each of the L MIMO layers needs to be searched, and the size of the area to be searched is proportional to $M^L$, which requires considerable operations. However, by introducing the QR decomposition, it is possible to calculate the upper bound and the lower bound of the minimum distance for each layer without constellation limit.

More specifically, when linear transformation is performed as in Expression 8 by using the unitary matrix Q obtained through the QR decomposition, the coordinates of the reception vector signal are changed without loss of information and the interference by another symbol turns into "0". Thus, the upper bound and the lower bound of the minimum distance for a particular symbol are derived. Therefore, the multidimensional search process such as Expression 4 is not required. That is, in Expression 8, R is a "triangular matrix" (values are present at only one side of main diagonal), and thus in the case of the 2×2 MIMO system, the upper bound and the lower bound of the minimum distance are immediately obtained as in Expression 9 and Expression 10.

Accordingly, in the present invention, since the upper bound and the lower bound of the minimum distance for each layer may be calculated through the QR decomposition for the effective channel matrix that is obtained by the matrix multiplication of the channel estimation value H and the precoding matrix W, the minimum distance is determined irrespective of a QAM modulation index. In particular, in the case where high-order modulation is used and the MIMO order is high, the minimum distance is calculated through fewer operations, compared to the related art.

At step S230, the upper bound and the lower bound of the minimum distance for each layer which are obtained at step S220 may be mapped to each codeword, and a mean mutual information per bit (MMIB) metric that is a transmission capacity per unit frequency may be extracted for each codeword.

After the upper bound and the lower bound of the minimum distance for the i-th layer are obtained at step S220, the minimum distance is obtained as follows. First, the value of the minimum distance $d_{min, i}^2$ may be postulated as $CINR_{ML, i}$, and the transmission capacity in the value of $CINR_{ML,i}$ may be calculated to be a mean value where a weighting is given to the upper bound and the lower bound as in Expression 11.

$$MMIB_{M-QAM,i} = \log_2(M) \cdot MMIB_{M-QAM}(d_{min,i,dB}^2) = \quad \text{[Expression 11]}$$
$$\log_2(M) \cdot MMIB_{M-QAM}(CINR_{ML,i,dB}) =$$
$$(1-\beta) \cdot MMIB_{M-QAM}(a_{i,dB}) +$$
$$\beta \cdot MMIB_{M-QAM}(b_{i,dB})$$

CINR stands for "carrier to interface plus noise ratio", and the reason why the value of the minimum distance is postulated as $CINR_{ML,i}$ is that the value may be regarded as an effective CINR value representing the performance of the ML receiver in the corresponding MIMO channel. That is, the demodulation performance of the i-th layer of a particular MIMO channel may be approximated into the minimum distance of the layer.

As described above, regarding the error rate performance of the MIMO ML detector, analytic expression expansion is difficult. Thus, in general, since "performance bound" is analyzed, calculation is performed with assumption of the mean value between the "upper bound" in which the influence of another symbol is completely excluded and the "lower bound" in which a signal component caused by the symbol is not used.

In operation of an actual receiver, it is impossible to completely exclude the interference influence of other symbols. Also, in practice, all received signals are used, and thus the actual performance is in the middle between the upper bound and the lower bound. Therefore, preferably, the value β, which is the weighting of the mean value, is optimized for each rank through simulations.

In Expression 11, $MMIB_{M-QAM,i}=\log_2(M)\times MMIB$ ($a_{i,dB}$ or $b_{i,dB}$) is calculated, which has the meaning of "bps/Hz per M-QAM symbol". That is, $MMIB_{M-QAM}$ (hereinafter, referred to as MMIB metric) is represented as the product of the mean mutual information per bit (MMIB) value that is a theoretical transmission rate in a range of [0, 1] defined for each particular SNR value when a M-QAM modulation symbol is used and of $\log_2(M)$ that is the maximum amount of the information of the M-QAM symbol. The value of M may be approximated using the maximum modulation index that may be set for each communication link. In most standards, the maximum modulation index value is set to 64QAM, 256QAM, and 1024QAM.

Figure 3:
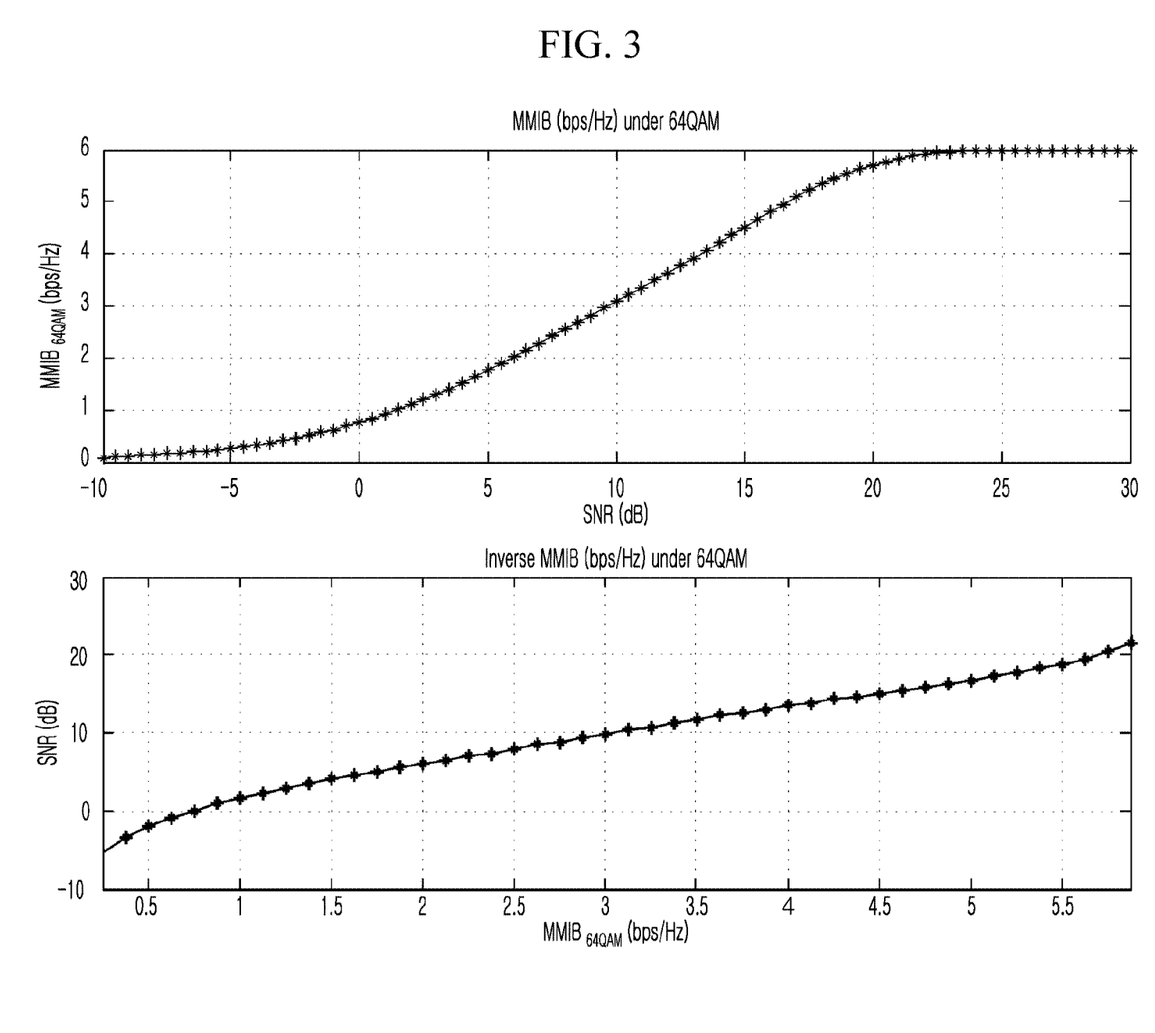
FIG. 3 is a diagram illustrating an MMIB function and the inverse function representing a channel capacity for 64QAM modulation according to an embodiment of the present invention.

FIG. 3 shows graphs of $MMIB_{64-QAM}$ function and inverse $MMIB_{64-QAM}$ (inverse function) in the 64-QAM modulation situation. The MMIB means the transmission rate (0 to 1) per unit frequency (Hz) of the AWGN channel in terms of information theory. The MMIB value for the AWGN channel is uniquely calculated in terms of information theory when using M-QAM modulation. FIG. 3 shows the values. In the case of a particular M-QAM modulation, the transmission capacity may be represented as the value of $\log_2(M)*MMIB(SNR_{dB})$, and the unit is bps (bits per sec)/Hz.

In the case of MIMO transmission, all transmission signals for respective layers are added up and received, and thus MIMO-symbol mutual interference occurs, and it is impossible to directly calculate the transmission capacity. Therefore, the SNR value for the equivalent virtual AWGN channel is required, and the value of $d_{min}$ may be used for this purpose. To this end, the demodulation performance of the ML receiver for a particular layer i is postulated as the value of $CINR_{ML,i}$, and this value is approximated into the value of $d_{min}$.

Therefore, in the present invention, the value of $d_{min}$ is postulated as the value of $CINR_{ML}$, and using the upper bound and the lower bound obtained through the QR decomposition of the MIMO channel, the transmission capacity is approximated into the MMIB metric that is a weighted sum of the upper bound and the lower bound of the value of $CINR_{ML}$, as in Expression 11.

In the meantime, when the value of v is equal to or greater than 3, multiple MIMO symbols simultaneously transmitted are mapped to one codeword. The mapping relationship is standard, and LTE and 5G NR Rel. 15 standards are shown in Table 1.

TABLE 1

< Codeword-to-layer mapping for spatial multiplexing >

| # of layer (v) | Symbol | Codeword mapping (LTE) | Codeword mapping (5G NR, Rel. 15) |
|---|---|---|---|
| 1 | $s_0$ | 0 | 0 |
| 2 | $s_0$ | 0 | 0 |
|   | $s_1$ | 1 |   |
| 3 | $s_0$ | 0 | 0 |
|   | $s_1, s_2$ | 1 |   |
| 4 | $s_0, s_1$ | 0 | 0 |
|   | $s_2, s_3$ | 1 |   |
| 5 | $s_0, s_1$ | 0 | 0 |
|   | $s_2, s_3, s_4$ | 1 | 1 |
| 6 | $s_0, s_1, s_2$ | 0 | 0 |
|   | $s_3, s_4, s_5$ | 1 | 1 |
| 7 | $s_0, s_1, s_2$ | 0 | 0 |
|   | $s_3, s_4, s_5, s_6$ | 1 | 1 |
| 8 | $s_0, s_1, s_2, s_3$ | 0 | 0 |
|   | $s_4, s_5, s_6, s_7$ | 1 | 1 |

As shown in Table 1, in the case where multiple MIMO symbols are mapped to one codeword, regarding the channel matrix constructed by estimated channel responses, MIMO symbol indexes mapped to respective codewords are arranged according to the sizes of channel column norms, and then the QR decomposition is performed.

As an example, the case of MIMO order v=4 will be described. As shown in Table 1, in the case of LTE, symbol ($s_0$, $s_1$) is mapped to codeword 0, and symbol ($s_2$, $s_3$) is mapped to codeword 1. Thus, the channel column norms are divided into two groups according to codeword, and arrangement as $\tilde{H}_4=[h_3\ h_2:\ h_0\ h_1]$ when $|h_1|\geq|h_0|$ and $|h_2|\geq|h_3|$ and $\tilde{H}_4=[h_0\ h_1:\ h_3\ h_2]$ takes place according to size. Next, the triangular matrix is obtained through the QR decomposition, and the value of $MMIB_{M-QAM,i}$ is calculated. Herein, as shown in Table 2, regarding the upper bound and the lower bound of the minimum distance of each codeword, values of the MMIB metrics for the upper bounds and the lower bounds of the minimum distances with respect to MIMO symbols mapped to respective codewords are obtained, and the value for the symbol having the minimum value is selected. In the case of 5G NR, symbol ($s_0$, $s_1$, $s_2$, $s_3$) is mapped to one codeword, and thus arrangement as $\tilde{H}_4=[h_3\ h_2\ h_0\ h_1]$ when $|h_1|\geq|h_0|\geq|h_2|\geq|h_3|$ and $\tilde{H}_4=[h_1\ h_0\ h_2\ h_3]$ takes place in order of size without grouping.

The arrangement method may be realized in various ways according to implementation and performance. When the column norm is not calculated to reduce the complexity, the simple index order considering the codeword group is considered. That is, in the case of MIMO order v=4, for LTE, $\tilde{H}_4=[h_3\ h_2:\ h_1\ h_0]$, $\tilde{H}_4=[h_1\ h_0:\ h_3\ h_2]$ may be implemented considering codeword mapping, and for 5G NR, there is one codeword, and thus $\tilde{H}_4=[h_3\ h_2\ h_1\ h_0]$, $\tilde{H}_4=[h_0\ h_1\ h_2\ h_3]$ may be implemented.

Considering future expandability of two methods, both LTE and 5G NR may define $\tilde{H}_4=[h_3\ h_2\!:\!h_1\ h_0]$, $\tilde{H}_4'=[h_1\ h_0\!:\!h_3\ h_2]$ considering two codeword groups as default operation. In this way, regardless of whether the column norm is calculated, indexes constituting channel matrices $\tilde{H}$ and $\tilde{H}'$ that are the input of QR decomposition are configured to be in a flipping relationship in such a manner as to reflect the average characteristic of the channel. This process is performed by a column flipping part 113 shown in FIG. 4. That is, the effective channel matrix $\tilde{H}$ and the matrix $\tilde{H}'$ resulting from the column flipping thereof are subjected to QR decomposition so that triangular matrices R and R' are obtained. From the diagonal elements of the triangular matrices, the upper bound and the lower bound of channel quality are obtained (see FIG. 5 and Expression 12).

Accordingly, in the 5G NR Rel. 15 standard, when v is equal to or smaller than 4, MIMO symbols are mapped to only one codeword. The upper bounds and the lower bounds for the minimum distances of respective symbols are arranged, and the minimum value thereamong is used to calculate the transmission capacity $\text{MMIB}_{M\text{-}QAM,i}$ of the codeword.

TABLE 2

| # of Layer | Symbol | CW | Lower Bound (a) | Upper Bound (b) |
|---|---|---|---|---|
| 2 | $S_0$ | 0 | MMIB(a) = MMIB($r_{11}$) | MMIB(b) = MMIB($r'_{00}$) |
|   | $S_1$ | 1 | MMIB(a) = MMIB($r'_{11}$) | MMIB(b) = MMIB($r_{00}$) |
| 3 | $S_0$ | 0 | MMIB(a) = MMIB($r_{22}$) | MMIB(b) = MMIB($r'_{00}$) |
|   | $S_1, S_2$ | 1 | MMIB(a) = min {MMIB($r'_{11}$), MMIB($r'_{22}$)} | MMIB(b) = min {MMIB($r_{00}$), MMIB($r_{11}$)} |
| 4 | $S_0, S_1$ | 0 | MMIB(a) = min {MMIB($r_{22}$), MMIB($r_{33}$)} | MMIB(b) = min {MMIB($r'_{00}$), MMIB($r'_{11}$)} |
|   | $S_2, S_3$ | 1 | MMIB(a) = min {MIB($r'_{22}$), MIB($r'_{33}$)} | MMIB(b) = min {MMIB($r_{00}$), MMIB($r_{11}$)} |
| ... | ... | ... | ... | ... |
| 8 | $S_0, S_1, S_2, S_3$ | 0 | MMIB(a) = min {MMIB($r_{44}$), MMIB($r_{55}$), MMIB($r_{66}$), MMIB($r_{77}$)} | MMIB(b) = min {MMIB($r'_{00}$), MMIB ($r'_{11}$), MMIB($r'_{22}$), MMIB($r'_{33}$)} |
|   | $S_4, S_5, S_6, S_7$ | 1 | MMIB(a) = min {MMIB($r'_{44}$), MMIB($r'_{55}$), MMIB($r'_{66}$), MMIB($r'_{77}$)} | MMIB(b) = min {MMIB($r_{00}$), MMIB($r_{11}$), MMIB($r_{22}$), MMIB($r_{33}$)} |

In Table 2, $\text{MMIB}(x)=\text{MMIB}_{M\text{-}QAM}[10\cdot\log_{10}(|x|^2/\sigma_n^2)]$ is used, and the value of the used triangular matrix R is shown in Expression 12.

$$R_3 = \begin{bmatrix} r_{00} & r_{01} & r_{02} \\ 0 & r_{11} & r_{12} \\ 0 & 0 & r_{22} \end{bmatrix},$$

$$R_4 = \begin{bmatrix} r_{00} & r_{01} & r_{02} & r_{03} \\ 0 & r_{11} & r_{12} & r_{13} \\ 0 & 0 & r_{22} & r_{23} \\ 0 & 0 & 0 & r_{33} \end{bmatrix}, \ldots,$$

$$R_8 = \begin{bmatrix} r_{00} & r_{01} & \cdots & r_{07} \\ 0 & r_{11} & \cdots & r_{17} \\ \vdots & \vdots & \vdots & \vdots \\ 0 & \cdots & 0 & r_{77} \end{bmatrix}$$

$$R'_3 = \begin{bmatrix} r'_{00} & r'_{01} & r'_{02} \\ 0 & r'_{11} & r'_{12} \\ 0 & 0 & r'_{22} \end{bmatrix},$$

[Expression 12]

$$R'_4 = \begin{bmatrix} r'_{00} & r'_{01} & r'_{02} & r'_{03} \\ 0 & r'_{11} & r'_{12} & r'_{13} \\ 0 & 0 & r'_{22} & r'_{23} \\ 0 & 0 & 0 & r'_{33} \end{bmatrix}, \ldots,$$

$$R'_8 = \begin{bmatrix} r'_{00} & r'_{01} & \cdots & r'_{07} \\ 0 & r'_{11} & \cdots & r'_{17} \\ \vdots & \vdots & \vdots & \vdots \\ 0 & \cdots & 0 & r'_{77} \end{bmatrix}$$

As described above, in the MIMO ML detector, the value of $\text{MMIB}_{M\text{-}QAM,i}$ that is the transmission capacity of each codeword may be calculated through the QR decomposition and MMIB metric operation.

Figure 4:
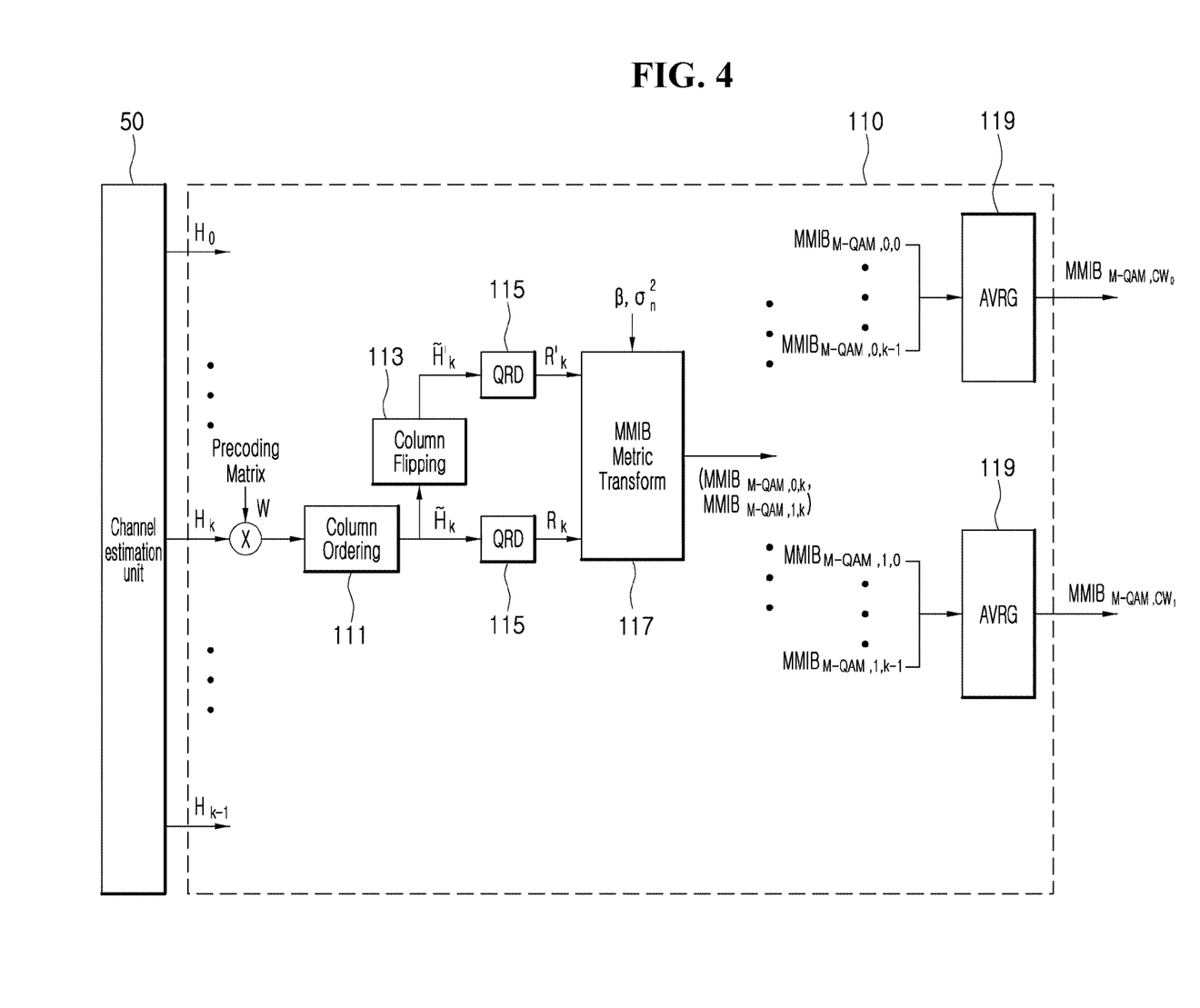
FIG. 4 is a block diagram illustrating a channel state analysis unit according to an embodiment of the present invention.

FIG. 4 shows a block diagram illustrating the channel state analysis unit 110 according to an embodiment of the present invention, which is an example where steps S210, S220, and S230 described above are implemented.

The channel state analysis unit 110 obtains the effective channel matrix by the matrix multiplication of the channel estimation value H and the precoding matrix W. A column ordering part 111, the column flipping part 113, and a QR decomposition part 115 operate to calculate the upper bound and the lower bound of the minimum distance for each layer. An MMIB metric transformation part 117 operates so that the upper bound and the lower bound of the minimum distance for each layer are mapped to each codeword and using the mean value where the weighting β is given to the upper bound and the lower bound of the minimum distance for each codeword, the MMIB metric that is the transmission capacity per unit frequency is extracted.

Figure 5:
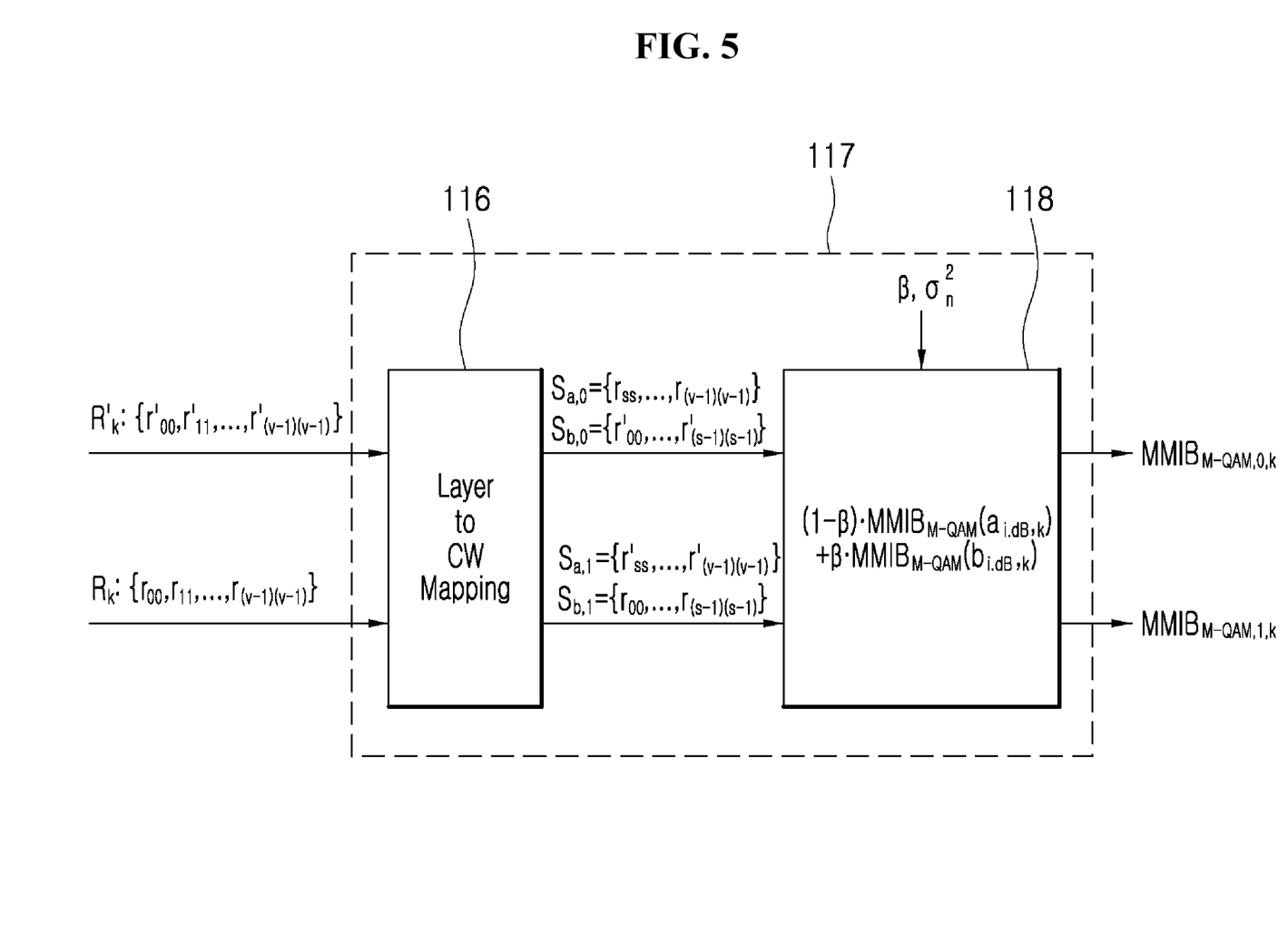
FIG. 5 is a block diagram illustrating an MMIB metric transformation part according to an embodiment of the present invention.

The MMIB metric transformation part 117 is shown in FIG. 5 and is an example of implementing Expression 11 where from the upper bound and the lower bound of the triangular matrix R, codeword mapping 116 and MMIB metric calculation 118 for each codeword take place.

At step S240, the optimum channel state information may be extracted from the transmission capacity of each effective channel which is extracted using the MMIB metric.

In general, the standard defines the channel state information (CSI) as follows. The RI value defines one value for all observation bands. The PMI or CQI value is defined to report on all bands or on one or several sub-bands that the terminal prefers. Accordingly, the RI, the PMI, and the CQI may be sequentially determined using the MMIB metric.

When reporting on one or several sub-bands, the MMIB metric average for all bands is obtained to determine the RI first, and under the corresponding rank, the sub-band PMI value having the maximum MMIB metric and the CQI value for the PMI are calculated for each sub-band.

Figure 6:
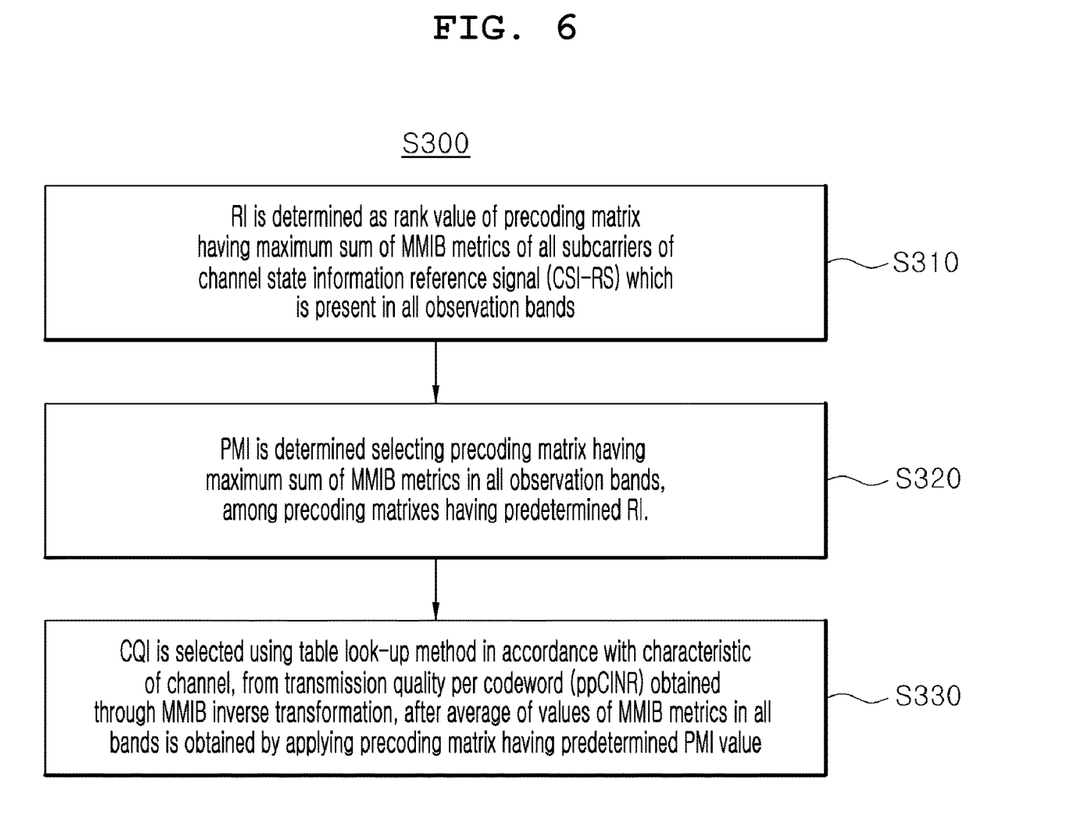
FIG. 6 is a flowchart illustrating a detailed example of a channel state information determination method according to an embodiment of the present invention.

FIG. 6 is a flowchart (S300) illustrating a detailed example of a channel state information determination method according to an embodiment of the present invention.

Referring to FIG. 6, at step S310, RI may be determined as the rank value of the precoding matrix having the maximum sum of MMIB metrics of all subcarriers of the channel state information reference signal which is present in all observation bands.

The precoding matrix W in FIG. 4 may be represented by $W_{v,m}$, which indicates the precoding matrix where the rank value is v and the PMI Index is m. Therefore, with respect to all (v, m) combinations defined in the standard, "the transmission capacity for the effective channel" where the channel H and the value of W are multiplied is compared, and the channel state information determination unit 120 may determine the value of W* (RI*, PMI*) having the optimum capacity in a particular channel situation. This is another advantage of the present invention.

That is, W* having the optimum capacity in a particular channel situation may be represented as in Expression 13.

$$W^* = \mathrm{argmax}_W C_{MMIB}(HW) \quad \text{[Expression 13]}$$

where $$C_{MMIB}(HW) = \mathrm{Layer}_0 \cdot MMIB_{Max\_QAM,CW_0} + \mathrm{Layer}_1 \cdot MMIB_{Max\_QAM,CW_1}$$

$$MMIB_{Max\_QAM,CW_i} = 1/K \sum_k MMIB_{Max\_QAM,i,k}$$

for $i = 0, 1$.

In Expression 13, $\mathrm{Layer}_i$ denotes the number of MIMO symbols mapped to the codeword i, and the value of Max_QAM denotes the maximum modulation order set between the terminal and the base station. Further, $MMIB_{Max\_QAM,i,k}$ denotes the channel capacity for the codeword i in the k-th subcarrier belonging to the observation band. The values are averaged for all K subcarriers within the observation band to obtain the value of $MMIB_{Max\_QAM,i}$.

In Expression 13, regarding $C_{MMIB}$(HW), in the case of MIMO transmission in LTE or 5G NR, when L symbols are simultaneously transmitted to a particular resource, one or several symbols are mapped to codeword 0 and the remaining symbols are mapped to codeword 1. Herein, the transmission capacity that may be achieved through MIMO transmission is represented, divided into codeword 0 and codeword 1.

Therefore, in order to obtain the optimum precoding matrix among precoding matrixes of (P×v), β≥v, which are defined in the standard for each rank v and to obtain the channel state information when using the precoding matrix, the transmission capacity of the channel is set as the objective function as shown in Expression 13, and the optimum RI and PMI are determined from Expression 14 and Expression 15 by searching for the objective function value with respect to each precoding matrix. That is, even if the ranks are different, it is possible to determine merits and demerits of all transmission capacities by comparing bps/Hz values, and when selecting the optimum rank value, the corresponding MMIB metric is used.

$$RI = v^* = \mathrm{Rank}(W^*) \quad \text{[Expression 14]}$$

$$PMI = m^* = \mathrm{Index\ of}\ W^*) \quad \text{[Expression 15]}$$

Accordingly, at step S320, the PMI may be determined selecting the precoding matrix having the maximum sum of MMIB metrics in all observation bands, among the precoding matrixes having the predetermined RI.

At step S330, the CQI may be selected, after the average of the values of the MMIB metrics in all bands is obtained by applying the precoding matrix having the PMI value predetermined at step S320, by using a table look-up method in accordance with the characteristic of the channel, from a transmission quality per codeword (ppCINR) obtained through MMIB inverse transformation. This is represented in Expression 16 and Expression 17.

$$ppCINR_{CW_i} = MMIB_{M-QAM}^{-1}(MMIB_{Max\_QAM,CW_i})\ \text{for}\ i=0,1, \quad \text{[Expression 16]}$$

$$CQI_i = \text{Table Look-Up}(ppCINR_{CW_i})\ \text{for}\ i=0,1. \quad \text{[Expression 17]}$$

In Expression 16, the value of ppCINR and the value of $MMIB_{M-QAM}$ have a 1:1 corresponding relationship. The value of ppCINR is that the channel capacity per codeword transformed into an equivalent virtual AWGN channel is indirectly represented as an SNR value, and the value of $MMIB_{M-QAM}$ is that the same is represented in units of bps/Hz.

In the meantime, the RI, the PMI, and the CQI are not necessarily determined and extracted only by the above-described method. If the RI is determined using a method completely different from the method described at step S310, the PMI is determined from the predetermined RI at step S320.

For example, as described in KR 10-2018-0165398 filed by the present applicant, the RI is determined through eigen decomposition using only the channel matrix H. Since the rank value is predetermined, the search range of the optimum W is limited to a case of having a particular rank value. Therefore, even if other methods are used to determine the RI, the present invention is applied to determine the PMI and the CQI. Similarly, the present invention may be applied to determine the RI, and other methods may be applied to determine the PMI. That is, it is preferable to make selection in terms of implementation considering the full-search complexity and the size of possible PMI set defined in the standard.

Figure 7:
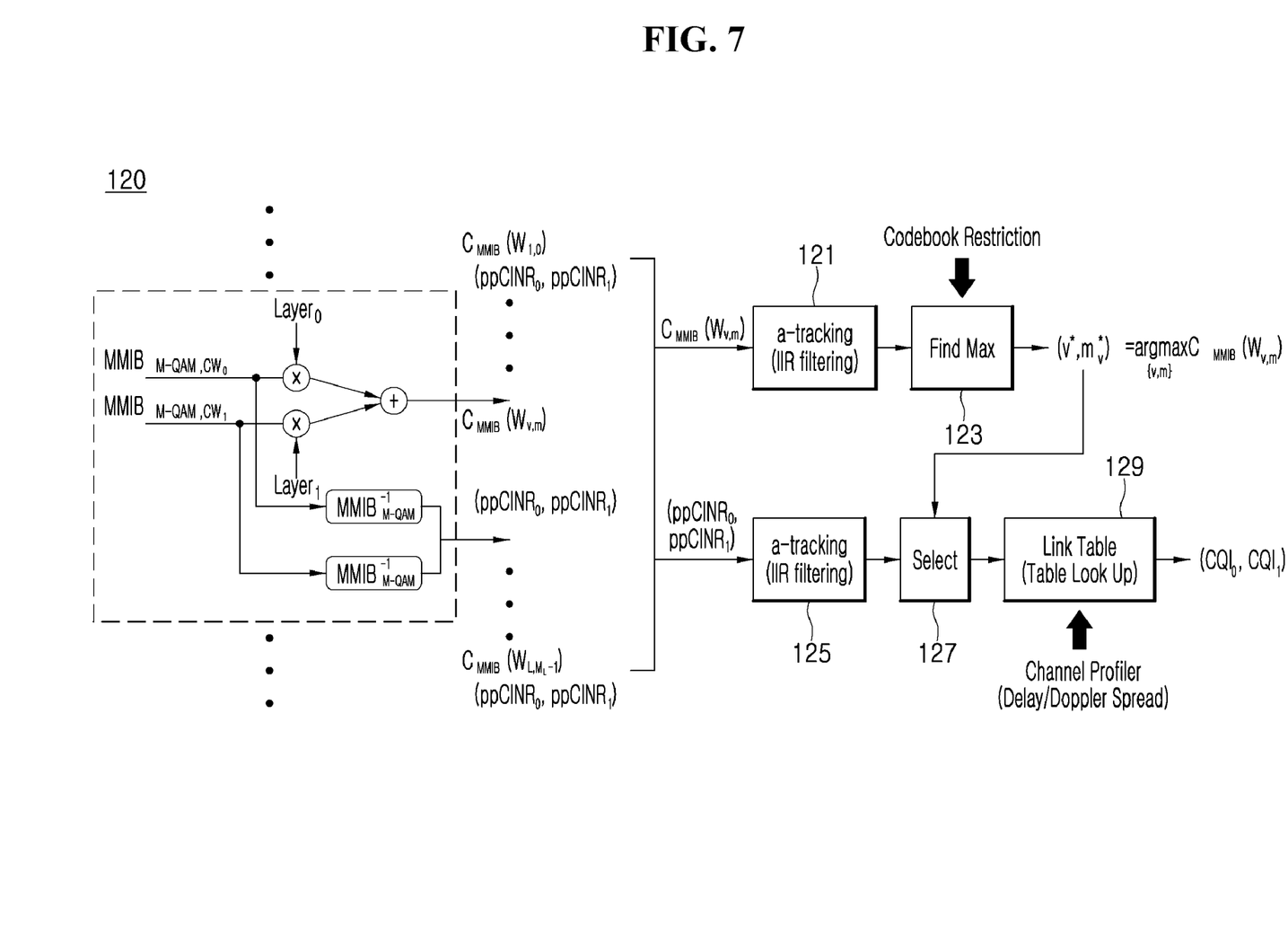
FIG. 7 is a block diagram illustrating a channel state information determination unit according to an embodiment of the present invention.

FIG. 7 is a block diagram illustrating the channel state information determination unit 120 according to an embodiment of the present invention. From the MMIB metric extracted by the channel state analysis unit 110, a process of determining the channel state information by using Expression 13 to Expression 17 described with reference to FIG. 6 is implemented.

As described above, according to the embodiments of the present invention, it is possible to obtain the minimum distance for each layer using the QR decomposition and the MMIB metric without a multidimensional search process. Thus, when the MIMO transmission order is high, it is possible to extract the channel state information (CSI) through fewer operations, compared to the related art.

Also, the above-described example of the channel state information extraction method using the QR decomposition and the MMIB metric may be implemented in the form of computer program instructions that are executed through various computer components. Also, the implemented computer program may be recorded on a computer-readable recording medium. Examples of the recording medium include a ROM, a magnetic disk, a compact disk, an optical disk, or the like, but no limitation thereto is imposed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A channel state information (CSI) extraction method in a multiple-input and multiple-output (MIMO) receiver used in a wireless communication system, the method comprising:
   obtaining a channel state information reference signal (CSI-RS);
   obtaining an effective channel matrix for each of a plurality of candidate ranks and a plurality of corresponding candidate precoding matrices and the effective channel matrix is determined by matrix multiplication of a candidate precoding matrix corresponding to each of the plurality of candidate ranks and a channel estimation value obtained through the channel state information reference signal (CSI-RS), wherein each of the plurality of candidate ranks includes at least one layer;
   calculating an upper bound and a lower bound of a minimum distance for each layer for each of the plurality of candidate ranks and each of the plurality of corresponding candidate precoding matrices through QR decomposition for the effective channel matrix;
   mapping the upper bound and the lower bound of the minimum distance for each layer for each of the plurality of candidate ranks and each of the plurality of corresponding candidate precoding matrices to a corresponding one of a plurality of codewords; and
   extracting a mean mutual information per bit (MMIB) metric that is a transmission capacity per unit frequency for each of the plurality of codewords for each of the plurality of candidate ranks and each of the corresponding candidate precoding matrices.

2. The method of claim 1, further comprising:
   determining a sum of MMIB by adding all the MMIB for each of the plurality of unit frequencies and for each of the plurality of codewords;
   determining a maximum sum of MMIB among the sum of MMIB for each of the plurality of candidate ranks and the plurality of corresponding candidate precoding matrices;
   determining the channel state information from a transmission capacity of an effective channel based on the maximum MMIB metric,
   wherein the channel state information includes a rank indicator (RI), a precoding matrix indicator (PMI) and a channel quality indicator (CQI) corresponding to the maximum MMIB.

3. The method of claim 1,
   wherein the MMIB metric is calculated through a sum process where a predetermined weighting is given to the upper bound and the lower bound.

4. The method of claim 1, further comprising:
   determining the rank indicator (RI) included in the channel state information as a rank value of the precoding matrix having the maximum sum of the MMIB metrics of all subcarriers of the channel state information reference signal which is present in all observation bands.

5. The method of claim 1, further comprising:
   determining the precoding matrix indicator (PMI) included in the channel state information by selecting the precoding matrix having the maximum sum of the MMIB metrics in all observation bands, among the precoding matrixes having a predetermined rank indicator (RI).

6. The method of claim 1, further comprising:
   determining the precoding matrix indicator (PMI) included in the channel state information by selecting the precoding matrix having the maximum sum of the MMIB metrics for each sub-band, among the precoding matrixes having a predetermined rank indicator (RI).

7. The method of claim 1, further comprising:
   selecting the channel quality indicator (CQI) included in the channel state information by using a table look-up method in accordance with a characteristic of a channel, from a transmission quality per codeword (ppCINR) obtained through MMIB inverse transformation, after an average of values of the MMIB metrics in all bands is obtained by applying the precoding matrix having a predetermined precoding matrix indicator (PMI) value.

8. The method of claim 1,
   wherein the upper bound and the lower bound are determined on the basis of diagonal elements of a triangular matrix generated through the QR decomposition for the effective channel matrix.

9. The method of claim 1, wherein when multiple MIMO symbols are mapped to one codeword, a value of the MMIB metric of the codeword is the minimum value among values of the MMIB metrics for the respective MIMO symbols.

10. The method of claim 1,
    wherein the QR decomposition is performed on each of matrixes resulting from column flipping of the effective channel matrix and the effective channel matrix.

11. A non-transitory, computer-readable recording medium having a program recorded thereon for executing a channel state information (C SI) extraction method in a multiple-input and multiple-output (MIMO) receiver used in a wireless communication system, the method comprising:
    obtaining a channel state information reference signal (CSI-RS);
    obtaining an effective channel matrix for each of a plurality of candidate ranks and a plurality of corresponding candidate precoding matrices and the effective channel matrix is determined by matrix multiplication of a candidate precoding matrix corresponding to each of the plurality of candidate ranks and a channel estimation value obtained through the channel state information reference signal (CSI-RS), wherein each of the plurality of candidate ranks includes at least one layer;
    calculating an upper bound and a lower bound of a minimum distance for each layer for each of the plurality of candidate ranks and each of the plurality of corresponding candidate precoding matrices through QR decomposition for the effective channel matrix;
    mapping the upper bound and the lower bound of the minimum distance for each layer for each of the plurality of candidate ranks and each of the plurality of corresponding candidate precoding matrices to a corresponding one of a plurality of codewords; and extracting a mean mutual information per bit (MMIB) metric that is a transmission capacity per unit frequency for each of the plurality of codewords for each of the plurality of candidate ranks and each of the corresponding candidate precoding matrices.

12. A MIMO receiver used in a wireless communication system, the MIMO receiver comprising:
a channel state analysis unit configured to:
obtain a channel state information reference signal (CSI-RS),
obtain an effective channel matrix for each of a plurality of candidate ranks and a plurality of corresponding candidate precoding matrices and the effective channel matrix is determined by matrix multiplication of a candidate precoding matrix corresponding to each of the plurality of candidate ranks and a channel estimation value obtained through the channel state information reference signal (CSI-RS), wherein each of the plurality of candidate ranks includes at least one layer,
calculate an upper bound and a lower bound of a minimum distance for each layer for each of the plurality of candidate ranks and each of the plurality of corresponding candidate precoding matrices through QR decomposition for the effective channel matrix,
map the upper bound and the lower bound of the minimum distance for each layer for each of the plurality of candidate ranks and each of the plurality of corresponding candidate precoding matrices to a corresponding one of a plurality of codewords, and
extract a mean mutual information per bit (MINIM) metric that is a transmission capacity per unit frequency for each of the plurality of codewords for each of the plurality of candidate ranks and each of the corresponding candidate precoding matrices; and
a channel state information determination unit configured to:
determine a sum of MMIB by adding all the MINIM for each of the plurality of unit frequencies and for each of the plurality of codewords,
determine a maximum sum of MMIB among the sum of MINIM for each of the plurality of candidate ranks and the plurality of corresponding candidate precoding matrices; and
determine the channel state information from a transmission capacity of an effective channel based on the maximum MMIB metric,
wherein the channel state information includes a rank indicator (RI), a precoding matrix indicator (PMI) and a channel quality indicator (CQI) corresponding to the maximum MMIB.

13. The MIMO receiver of claim 12,
wherein in the determining of the sum of MMIB, a predetermined weighting is given to the upper bound and the lower bound.

14. The MIMO receiver of claim 12,
wherein the rank indicator (RI) included in the channel state information is determined as a rank value of the precoding matrix having the maximum sum of the MMIB metrics of all subcarriers of the channel state information reference signal which is present in all observation bands.

15. The MIMO receiver of claim 12,
wherein the precoding matrix indicator (PMI) included in the channel state information is determined selecting the precoding matrix having the maximum sum of the MMIB metrics in all observation bands, among the precoding matrixes having a predetermined rank indicator (RI).

16. The MIMO receiver of claim 12,
wherein the precoding matrix indicator (PMI) included in the channel state information is determined selecting the precoding matrix having the maximum sum of the MMIB metrics for each sub-band, among the precoding matrixes having a predetermined rank indicator (RI).

17. The MIMO receiver of claim 12,
wherein the channel quality indicator (CQI) included in the channel state information is selected using a table look-up method in accordance with a characteristic of a channel, from a transmission quality per codeword (ppCINR) obtained through MMIB inverse transformation, after an average of values of the MMIB metrics in all bands is obtained by applying the precoding matrix having a predetermined precoding matrix indicator (PMI) value.

18. The MIMO receiver of claim 12,
wherein the upper bound and the lower bound are determined on the basis of diagonal elements of a triangular matrix generated through the QR decomposition for the effective channel matrix.

19. The MIMO receiver of claim 12,
wherein when multiple MIMO symbols are mapped to one codeword, a value of the MMIB metric of the codeword is the minimum value among values of the MMIB metrics for the respective MIMO symbols.

20. The MIMO receiver of claim 12,
wherein the QR decomposition is performed on each of matrixes resulting from column flipping of the effective channel matrix and the effective channel matrix.

* * * * *